March 24, 1970    T. W. BEEKER ET AL    3,501,776
ELECTRO-PNEUMATIC CONVERTER FOR OPERATING AN ARTIFICIAL LIMB
Filed Aug. 7, 1967      3 Sheets-Sheet 1
FIG. 1
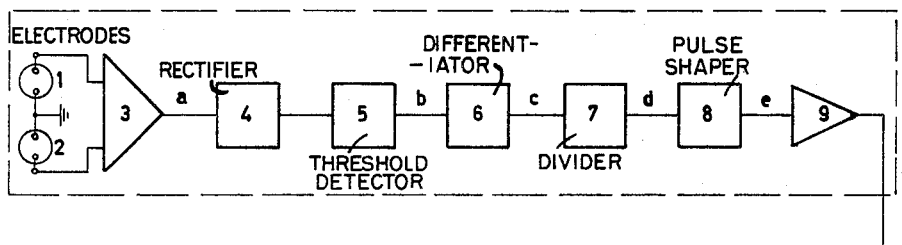
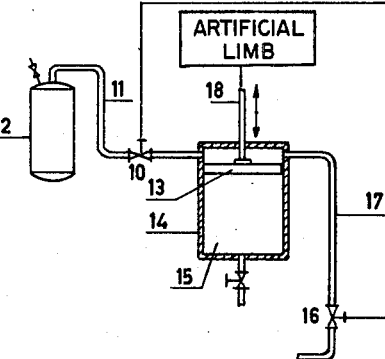
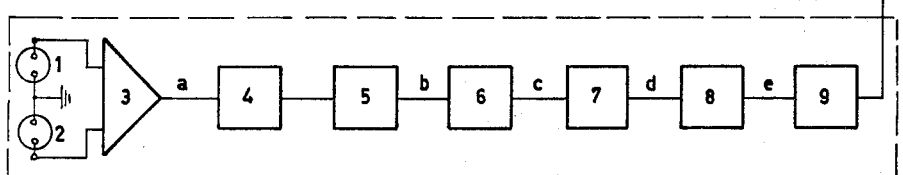
INVENTORS FIG. 3
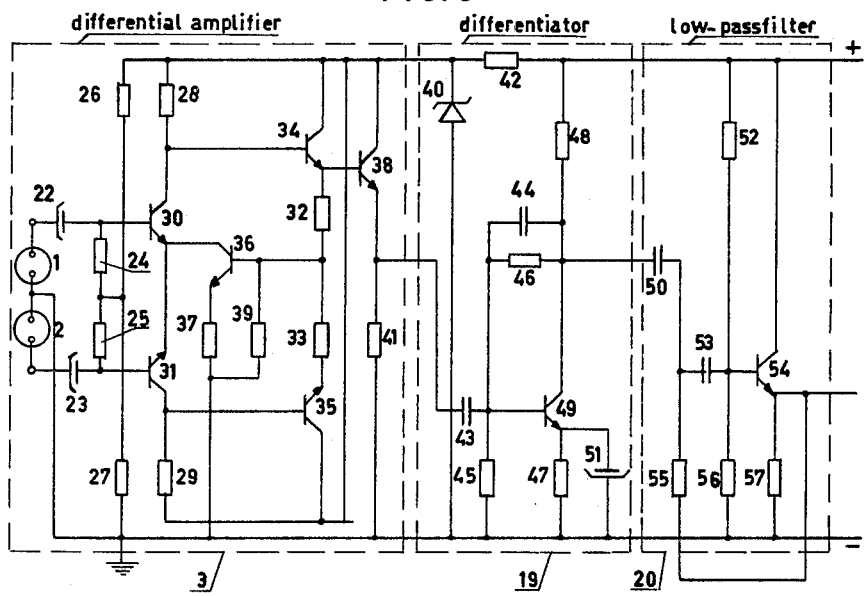
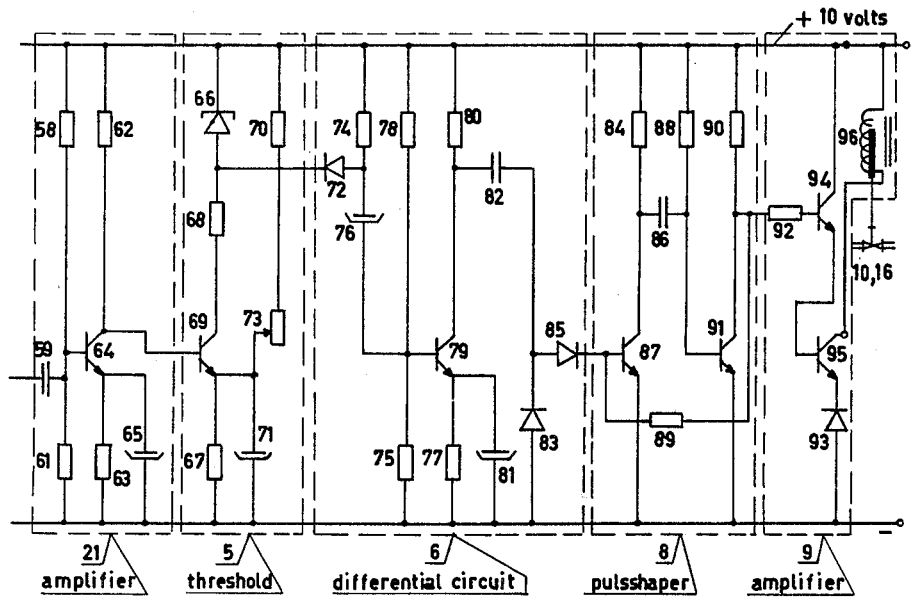

United States Patent Office 3,501,776
Patented Mar. 24, 1970

3,501,776
ELECTROPNEUMATIC CONVERTER FOR OPERATING AN ARTIFICIAL LIMB
Theodorus Willem Beeker, Amersfoort, Adriaan den Hertog, Paterswolde, Johannes During, Utrecht, and Theodorus Cornelis Maria van Miltenburg, Jutfaas, Netherlands, assignors to Nederlandse Organisatie voor Toegepast-Natuurwetenschappelijk Onderzoek ten behoeve van de Volksgezond Heid, The Hague, Netherlands, a corporation of the Netherlands
Filed Aug. 7, 1967, Ser. No. 658,759
Claims priority, application Netherlands, Aug. 30, 1966, 6612233
Int. Cl. A61f 1/00, 1/06
U.S. Cl. 3—1.1         5 Claims

ABSTRACT OF THE DISCLOSURE

A control device provided with a body electrode for picking up a muscle signal, in which the muscle signal is converted via an electrofluid converter into a signal consisting of fluid pulses of a constant duration, and with a repetitive frequency which is equal to the repetitive frequency of the pulses of the original muscle signal, and in which the pulses themselves are utilized to effect a displacement in a cylinder of a piston controlling an artificial member.

---

Figure 2:
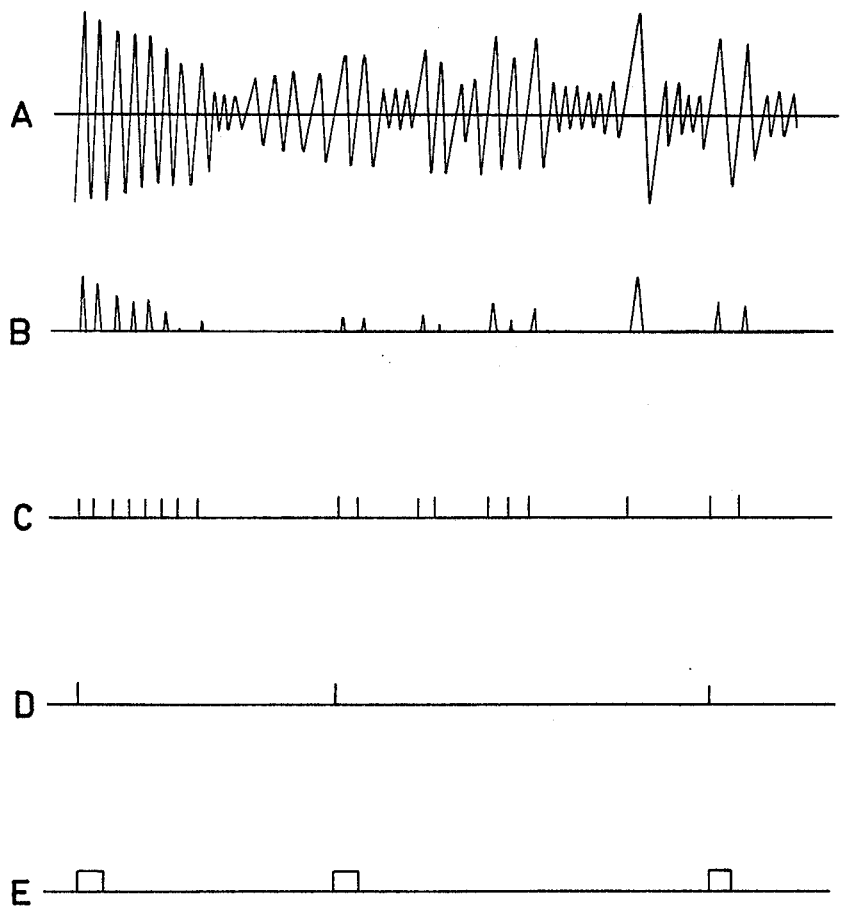

The present invention relates to a control device provided with an electric sensor, an electrofluid converter controlled by the sensor and a control member which is controlled by the converter with the fluid.

In such a known device, the sensor controls a motor via a code converter, the motor shaft being coupled to a pneumatic relay, the output pressure of which is proportional to the electric value measured by the sensor and in which the gas pressure acts on a membrane controlling a valve, by which a current in a pipe is regulated.

The object of the present invention is to provide a control device for artificial limbs. The known devices have serious drawbacks such as an energy consumption which is too high and in addition to this a weight that is too high owing to the use of a motor with the apparatuses associated with it.

The distinguishing feature of the invention is that the sensor is a body electrode, which, via an amplifier, an adjustable level threshold and a pulse shaper can emit electric pulses of constant duration to an electric valve as a converter, so that during each pulse or part of each pulse the valve is open and can let through a quantity of fluid equal or proportional to a pulse ascertained by the sensor.

Then the control member can, for instance, consist of a piston in a cylinder, which is shifted by the quantity of fluid let through, and by means of which the displacement may be transmitted mechanically on the artificial member, which will then carry out a movement which is proportional to the aforesaid displacement.

In general, a member will be commanded by one or more flexor and extensor muscles, which emit a number of myographic pulses varying from about 200 to about 5000 a second.

For one kind of muscle, the movement of the piston will have to be opposite to the movement for the other kind of muscles. For the one movement a fluid will be admitted into the cylinder from a reservoir via the valve belonging to it, while for the other movement the fluid will discharge from the above cylinder via the valve belonging to this movement.

The invention will be elucidated hereinafter with reference to diagrams of an embodiment of the invention and a few further diagrams.

FIG. 1 is a block diagram of the embodiment of the invention;
FIG. 2 shows diagrams of signals for a number of points in the block diagram;
FIG. 3 is an electrical schematic of the circuitry illustrated in FIGURE 1.

In the block diagram part I of FIGURE 1, the numerals 1 and 2 refer to body electrodes, which are provided on the skin parallel to the length of the controlling muscle for instance on a flexor muscle, and which sense a voltage strongly varying in time.

Both body electrodes 1 and 2 are required in order to suppress external interference signals as much as possible by means of a differential amplifier 3.

It has been found that the seemingly most irregular-looking signal emitted by the muscles which consists of amplified myographic pulses, can be used at the output $a$ of the differential amplifier 3 for the direct control of artificial members, provided care is taken that the signals of the nearest adjoining muscles are suppressed as much as possible.

For this purpose, the embodiment of the invention has been provided with a rectifier 4 and an adjustable level threshold 5, which can reduce the original number of myographic pulses to, for instance, about half at the point $b$, which then mainly come from the controlling muscle.

A differentiating network 6 converts the aforesaid pulses B into pulses of the shape as shown in diagram C.

The divider 7 divides the number of pulses of the C-shape occurring per second by eight so as to form a number of said pulses, which the valve 10 can handle.

A pulse shaper 8 converts the pulses of the D-shape into pulses of the E-shape having a constant pulse width of almost 3 milliseconds.

The energy amplifier 9 opens the valve 10 each time a pulse arrives.

During each pulse over the lead 11, a fixed quantity of fluid is brought into the space over the piston 13 in the cylinder 14 from the pressure vessel 12. The space is thus pumped up with equal strokes varying in number per unit of time.

The piston 13 is supported on a compressible fluid cushion 15 in the cylinder 14.

In the block diagram part II of FIG. 1 for the control device for the extensor muscle is equal to the part I for the flexor muscle, therefore, corresponding elements are indicated by like reference numerals.

The valve 16 in the lead 17 reacts to the pulses obtained from the signals of the extensor muscle, so that the piston 13 shifts upwards as a result of the counter-pressure from the fluid cushion 15.

An artificial member may be secured to the rod 18.

In the above-described embodiment of the invention, the elements are preferably coupled in such a manner that the valves 10 and 16 cannot be open simultaneously.

Diagram A of FIGURE 2 gives a somewhat idealized representation of the signal consisting of myographic pulses.

In reality, this signal comprises a number of intermediate turning points.

The said turning points may derive from the controlling muscle.

In order to establish all the points, it is desirable that the differential amplifier 3 should be followed by a differentiator. The output signal of the differentiator is preferably offered directly to the level threshold 5, whereby again a signal is obtained of the shape as shown in diagram B, but with more information. In the embodiment of the invention, the differential amplifier 3 is followed by a rectifier 4, which in turn is followed by a level threshold 5.

This threshold 5 has an adjustable level of less than half the peak-to-peak value of the myograph signal. If a level threshold is available having an adjusting level which lies, for instance, between half the peak-to-peak value and the whole peak-to-peak value of the myographic signal, then the rectifier 4 is superfluous.

FIG. 3 shows the electronical circuit of the parts I and II respectively of the block diagram of FIGURE 1 in a more detailed form.

As extra elements there have been provided a differentiator 19, a low pass filter 20 and an amplifier 21.

In this circuit, the rectifier 4 is superfluous. The dividers 7 could also be omitted from this circuit, because the inventor uses a very quick valve 10 or 16 respectively, which he has designed for this purpose. This valve 10 or 16 is operated by the solenoid 96 in the energy ampifier 9.

Here follows a table stating the values of the elements used.

Condensers:

22, 23, 53—0.8 microfarad
43—10,000 micromicrofarads
44—2,200 micromicrofarads
50, 59—0.22 microfarad
51—25 microfarads
65, 71, 81—10 microfarads
76—0.33 microfarad
82—120 micromicrofarads
86—47 micromicrofarads Resistors:

24, 25—1M ohm
26, 27, 37—0.22M ohm
28, 29—0.56M ohm
32, 33, 58, 90—56K ohms
39—33K ohms
41, 45, 62, 67, 84—10K ohms
42, 47—560K ohms
46—47K ohms
52—39K ohms
55—680K ohms
56, 80—22K ohms
57, 70—4.7K ohms
61—6.8K ohms
63, 74—1K ohm
68—2.7K ohms
73—20K ohms variable
75—27K ohms
77—5.6K ohms
78—68K ohms
88—0.18M ohm
89—0.1M ohm
92—0.47M ohm Transistors:

30, 31, 35, 36—Intermetall BFY23
49, 54, 64, 69, 79, 87, 91, 94—2N3707
95—MM2711

Diodes:

40—¼ M6.2AZ
66—1N3712
72—OA85
83—SFD108
85, 93—OA202

We claim:
1. A control device for operating an artificial limb, comprising; a pair of body electrode sensing elements, means for differentially amplifying the output signals of said sensing elements, adjustable threshold detector means for filtering the amplified signal, means for shaping the threshold detector output to provide pulses of constant pulse width, a fluid valve reservoir, and a fluid valve controlled by said constant pulse width pulses to receive fluid from said fluid reservoir and operate said artificial limb.

2. A control device as in claim 1 further comprising means for dividing the threshold detector output.

3. A control device as in claim 1 further comprising means for differentiating the threshold detector output.

4. A control device as in claim 1 wherein said threshold detector has an adjustable voltage level which is less than half the peak-to-peak value of the differentially amplified signal.

5. A control system for operating an artificial limb comprising a pair of control devices each in accordance with the control device of claim 1 wherein one control device adds fluid to said valve and the other control device takes fluid from said valve.

References Cited

FOREIGN PATENTS 118,581 6/1958 U.S.S.R.
1,490,202 6/1967 France.

OTHER REFERENCES

"Muscle Substitutes and Myo-Electric Control" by A. Bottomley et al., Radio and Electronic Engineer, vol. 26, No. 6, Dec. 1963, pages 439–448.

"An Artificial Hand Controlled by the Nerves" by A. Bottomley et al., New Scientist, vol. 21, No. 382, Mar. 12, 1964, pages 668–671.

"New Techniques in Medical Electronics," Wireless World, May 1966, page 234.

RICHARD A. GAUDET, Primary Examiner

R. L. FRINKS, Assistant Examiner

U.S. Cl. X.R.

3—1.2